Figure 1:
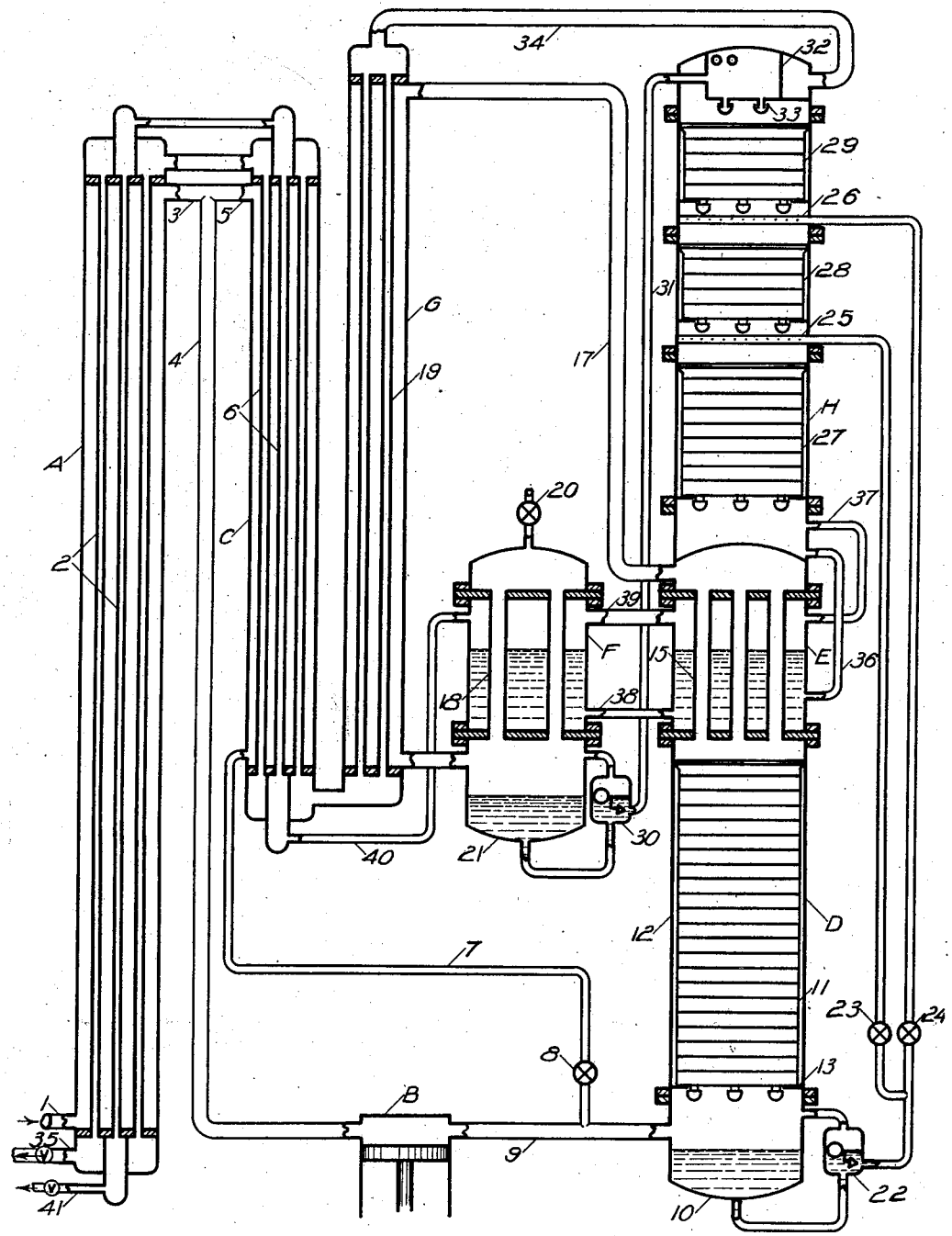

INVENTOR
William Lane de Baufre

INVENTOR
William Lane De Baufre

Patented July 31, 1945

2,380,417

UNITED STATES PATENT OFFICE 2,380,417

PROCESS AND APPARATUS FOR PRODUCING INDUSTRIAL OXYGEN

William Lane De Baufre, Lincoln, Nebr.

Application September 9, 1941, Serial No. 410,150

19 Claims. (Cl. 62—175.5)

This invention relates to plants for producing oxygen for industrial purposes.

When industrial oxygen is required for cutting and particularly for welding, the oxygen should be of very high purity, 99.5 per cent or better. An oxygen plant arranged and operated to produce such high purity oxygen, will produce nitrogen of a purity of about 95 per cent or less. The oxygen carried off in the nitrogen therefore equals 20 per cent or more of the oxygen in the atmospheric air processed. That is, the yield of oxygen is 80 per cent or less of the oxygen originally in the air processed when high purity oxygen is produced.

When industrial oxygen is used for enriching atmospheric air blown into a blast furnace for making pig iron, lower oxygen purity is satisfactory although slightly more oxygen is required of the lower purity to attain the same enrichment. When the purity of the oxygen produced in an air separation plant is lowered, the nitrogen purity is raised. This means that less oxygen is lost in the nitrogen. Consequently, the yield of oxygen is increased in the lower purity oxygen product for the same amount of atmospheric air processed. By raising the nitrogen purity to 99 per cent, the yield of oxygen is increased to 95 per cent.

The investment cost and the operating expense of an air separation plant are dependent mainly upon the quantity of air processed and are affected but slightly by the purities of the oxygen and nitrogen produced. Consequently, the higher the yield of oxygen, the lower is the cost of oxygen produced for enrichment purposes and other industrial purposes for which a reduced oxygen purity is satisfactory.

An oxygen plant designed and built to produce high purity oxygen, can be operated to produce lower purity oxygen with higher yield merely by changing the ratio of the rates of withdrawal of the oxygen and nitrogen products. If this is done, however, the oxygen purity is greatly reduced, generally to less than 90 per cent, when the nitrogen purity is raised to 99 per cent with an oxygen yield of 95 per cent.

An oxygen purity of 95 to 96 per cent with a yield of 95 per cent can be obtained in an oxygen plant proportioned for the purpose. If this oxygen plant were operated, however, to produce oxygen of a purity of 99.5 per cent, the yield of oxygen would be very low, due to the low purity of nitrogen produced. The yield would be much lower than in a plant properly proportioned to produce high purity oxygen. That is, the proportions of a plant to produce high purity oxygen with the maximum corresponding yield are different from the proportions of a plant to produce high yield of oxygen with the maximum corresponding purity.

The principal objective of the present invention is to provide means in an air separation plant to change from the production of oxygen with high purity and maximum corresponding yield to the production of oxygen with high yield and maximum corresponding purity.

When an oxygen plant designed and built to produce high purity oxygen, is operated to produce high purity nitrogen with reduced oxygen purity, the operating conditions in the first or preliminary stage of rectification are changed as well as those in the second or final stage of rectification. Less liquid nitrogen is throttled from the first stage to serve as liquid reflux in the second stage in order that this liquid reflux will be nitrogen of higher purity and thereby produce the high purity desired in the nitrogen product of the second stage. Ordinarily, the preliminary rectifier is so constructed that the conditions of operation in the first stage can be changed by the operator so as to vary the purity of the liquefied nitrogen vapor withdrawn therefrom. This, however, places within the manual control of the operator, a variable which affects the efficiency of operation of the oxygen plant. In the hands of an unskillful operator, the efficiency may be materially reduced.

Another objective of the present invention is to provide means in an air separation plant to change from high purity oxygen to high yield of oxygen without changing the operating conditions in the preliminary rectification.

When the same amounts of liquefied high purity nitrogen and of oxygen-rich liquid are withdrawn from the preliminary rectifier, it becomes possible to so design the preliminary rectifier that the operation of the whole plant becomes largely automatic, thereby reducing the attention necessary by the operator.

A further object of the invention is to render the operation of an oxygen plant largely automatic and to arrange the plant so that the operation will be most efficient under all conditions.

If the plant is to be operated to produce high purity nitrogen as well as nitrogen of lower purity with high purity oxygen, the liquid reflux in the final rectifier must be sufficiently pure to produce the highest purity nitrogen product desired. If conditions in the preliminary rectifier are to remain constant, the final rectifier must be proportioned to produce low purity nitrogen product in spite of the high purity liquid nitrogen reflux when high purity oxygen is produced.

Another object of the invention is to obtain a high purity oxygen product with high purity liquid nitrogen reflux in the final rectifier.

In order to obtain the highest possible yield of oxygen with the least possible reduction in oxygen purity, advantage must be taken of all arrangements which will increase refluxes in both the preliminary and final rectifiers.

Another object of the invention is to take advantage of all possible heat transfers for increasing refluxes in the process.

These objects and such other advantages as may hereinafter appear or are incident to the invention, are realized by the method and apparatus shown in preferred forms on the accompanying drawings.

Figure 2:
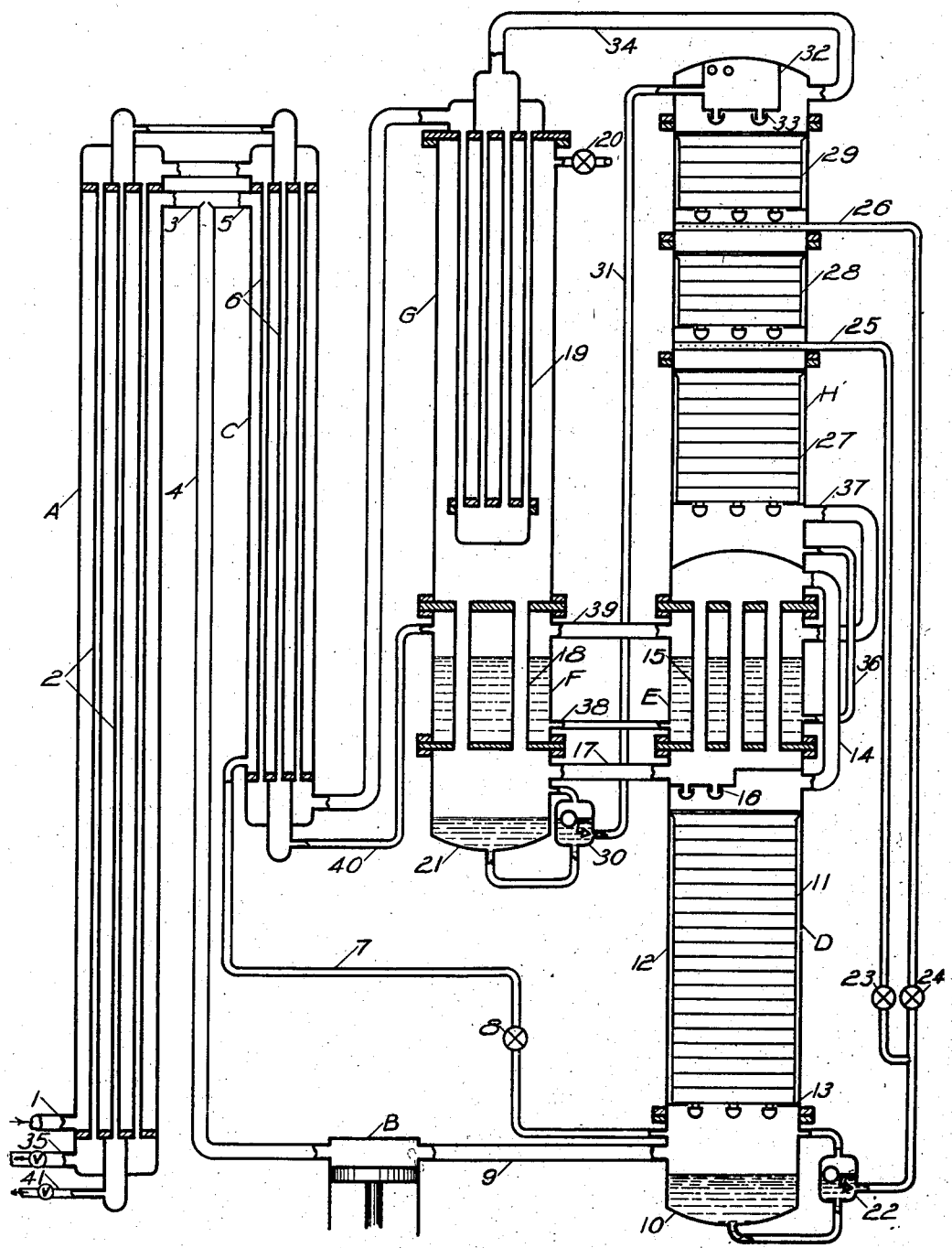

This invention applies particularly to two-stage plants as shown in Figure 1 and in Figure 2 for rectifying atmospheric air into oxygen and nitrogen products. As the differences between these two preferred forms of the invention are in details only, the following description may be read on both figures except where one figure is specifically mentioned.

Atmospheric air to be processed enters pipe 1 at about atmospheric temperature and compressed to a pressure of 300 to 600 lb. per sq. in. This compressed air has been freed of carbon dioxide in scrubbing tower not shown. If the compressed air has not been dehydrated, interchangers A are provided in multiple, so that one interchanger may be defrosted while the remaining interchangers are cooling the compressed air processed. The compressed air is cooled in interchanger A to a temperature below minus 100 centigrade as it passes up and around tubes 2 through which the oxygen and nitrogen products return.

The cooled compressed air leaves interchanger A through pipe 3. The larger part of the cooled compressed air flows through pipe 4 to expansion engine B where the cooled compressed air is expanded with performance of external work to a still lower temperature. The smaller part of the cooled compressed air flows through pipe 5 into liquefier C where it is liquefied by heat transfer to the oxygen and nitrogen products returning through tubes 6. The liquefied air is discharged through pipe 7 and is throttled through valve 8 into exhaust pipe 9 from expansion engine B or directly into preliminary rectifier D.

The expanded and throttled air enter preliminary rectifier D as shown. The liquid fraction drops into pot 10 at the lower end of preliminary rectifier D while the vapor fraction of the entering air rises through trays 11. Trays 11 are constructed as described and claimed in U. S. Patent 1,956,495, issued April 24, 1934. The outside diameter of trays 11 is less than the inside diameter of shell 12 in order that a group of trays can be assembled and then inserted into the rectifier shell. The group of trays rests on and is fastened to a ring support 13 attached to shell 12. The edge of the topmost tray has a larger diameter so that it fits tightly within shell 12 to prevent leakage between the trays and the shell.

Vapor from the topmost tray enters tubes 15 of vaporizer E where the vapor is partly condensed. The resulting liquid flows down through trays 11 of preliminary rectifier D as a liquid reflux for rectifying the rising vapor from the entering atmospheric air into nitrogen vapor of high purity, 99 per cent or better, and an oxygen-rich liquid which accumulates in pot 10. With an efficient preliminary rectifier and proper proportions of the whole apparatus, this oxygen-rich liquid is nearly in phase equilibrium with the entering atmospheric air at the same time that nitrogen vapor of 99 per cent or better leaves the topmost tray in preliminary rectifier D.

In Figure 1, the nitrogen vapor from trays 11 in preliminary rectifier D flows up through tubes 15 where its purity is improved by further rectification due to counterflow of rising vapor and down-flowing liquid. The nitrogen leaving through pipe 17 is therefore of higher purity than the nitrogen vapor rising from trays 11. In Figure 2, the nitrogen vapor flows up through pipe 14 and then down through tubes 15 so that there is no further rectification due to counterflow of vapor and liquid within these tubes. The nitrogen leaving through pipe 17 in Figure 2 is therefore of substantially the same purity as the nitrogen vapor rising from trays 11. In this case, a vapor seal 16 must be provided for the condensed nitrogen returning to trays 11 as a liquid reflux.

In Figure 2, the vapor remaining unliquefied from vaporizer E passes directly from pipe 17 to tubes 18 within condenser F. From tubes 18, the vapor still remaining uncondensed passes over tubes 19 in exchanger G which are cooled by the nitrogen product of the final rectification as explained later. In Figure 1, the nitrogen from pipe 17 passes over tubes 19 in exchanger G before the vapor flows up through tubes 18 in condenser F. In both figures, a small quantity of gas is withdrawn through valve 20 to prevent accumulation of any gas which is non-condensible under the existing pressure and temperature. In both figures, practically all of the high purity nitrogen vapor from the preliminary rectification is liquefied and collects in pot 21 at the bottom of condenser F.

The oxygen-rich liquid accumulated in pot 10 at the bottom of preliminary rectifier D is automatically withdrawn by trap 22, as described and claimed in U. S. Patent 2,062,781, issued December 1, 1936. This oxygen-rich liquid is discharged through valve 23 or through valve 24 into final rectifier H. If discharged through valve 23, the oxygen-rich liquid flows to perforated pipe 25 at about the middle point of final rectifier H with about an equal number of trays above and below the inlet. If discharged through valve 24, the oxygen-rich liquid flows to perforated pipe 26 at a point about one-fourth to one-third of the total number of trays from the top of final rectifier H. The trays in the main rectifier are arranged in three groups 27, 28 and 29, respectively. Each group of trays is arranged as previously described for group of trays 11 in preliminary rectifier D.

Reflux liquid for final rectifier H is furnished by the high purity nitrogen liquid which collects in pot 21 at the bottom of condenser F. This nitrogen liquid is automatically withdrawn by trap 30 and flows through pipe 31 to vessel 32 within the top of final rectifier H. The high purity nitrogen liquid from pot 21 is injected into vessel 32 in order that vapor may separate therefrom without disturbing the nitrogen product of the final rectification. The nitrogen liquid flows through vapor seals 33 to the topmost tray in group 29. The separated nitrogen vapor flows through holes in the walls of vessel 32 and joins the nitrogen product of rectification which leaves through pipe 34.

The oxygen-rich liquid entering final rectifier H through perforated tube 25 or 26 is rectified by trays 27, 28 and 29 into a nitrogen vapor product and an oxygen liquid product. The nitrogen vapor product leaves final rectifier H through pipe 34. This nitrogen product flows through tubes 19 in exchanger G where the nitrogen vapor is warmed somewhat in condensing nitrogen vapor from the preliminary rectification. In both figures, the resulting condensed nitrogen augments the nitrogen liquid in pot 21 of condenser F, thereby increasing the liquid nitrogen reflux in the final rectification.

The nitrogen product of the final rectification flows through the tubes in liquefier C and in interchanger A where the nitrogen product is warmed nearly to the temperature of the atmospheric air entering pipe 1, when the nitrogen product leaves through pipe 35.

Liquid oxygen from final rectifier H flows through pipe 36 to the space surrounding tubes 15 within vaporizer E. Here the liquid oxygen is partly vaporized in condensing nearly pure nitrogen vapor from preliminary rectifier D to form liquid reflux for the preliminary rectification. The resulting oxygen vapor returns through pipe 37 to final rectifier H where it forms the vapor reflux for the final rectification. The remaining liquid oxygen flows from vaporizer E through pipe 38 to the space surrounding tubes 18 in condenser F. Here the vaporization of the liquid oxygen is completed and the resulting oxygen vapor leaves through pipe 40. Pipe 39 equalizes the pressures in vaporizer E and condenser F by permitting flow of vapor in either direction.

With the pressure equalized in vaporizer E and condenser F, the liquid oxygen will rise to substantially the same level in both vaporizer E and condenser F. The heat transfer surfaces in vaporizer E and condenser F consist of vertical tubes extending between lower and upper tube sheets. By having the two lower tube sheets at the same level, the tubes will be submerged equally in liquid oxygen in vaporizer E and condenser F. Hence, as the liquid level varies in vaporizer E during operation of the plant, the heat transfer surfaces in vaporizer E and condenser F will be submerged in a substantially constant ratio. As only the submerged surface of these tubes is very effective in heat transfer from the boiling oxygen liquid to the nitrogen vapor condensing therein, the amounts of nitrogen liquified in vaporizer E and condenser F will be maintained in a substantially constant ratio as the liquid level varies. As the oxygen-rich liquid which accumulates in pot 10 at the bottom of preliminary rectifier D is about equal to the amount of liquid nitrogen reflux from vaporizer E, it follows that this construction maintains nearly constant proportions of oxygen-rich liquid and nitrogen liquid accumulating in pots 10 and 21 respectively. This makes possible the use of automatic means 22 and 30 to discharge these liquids into final rectifier H.

The oxygen product of the final rectification returns from pipe 40 through the tubes in liquefier C and interchanger A where the oxygen product is warmed nearly to the temperature of the atmospheric air entering pipe 1 when the oxygen product leaves through pipe 41.

The valves on outlet pipe 35 for returning nitrogen and outlet pipe 41 for returning oxygen permit the operator to vary the relative amounts of oxygen and nitrogen withdrawn from final rectifier H. When less oxygen and more nitrogen are withdrawn from any air separation plant, the purity of the oxygen increases and the purity of the nitrogen decreases. When this is done in the present plant, the operator closes valve 23 and opens valve 24 so that the oxygen-rich liquid from pot 10 will enter final rectifier H through pipe 26 rather than through pipe 25, thereby obtaining the greatest yield possible of high purity oxygen. When more oxygen and less nitrogen are withdrawn from any air separation plant, the purity of the oxygen decreases and the purity of the nitrogen increases. When this is done in the present plant, the operator closes valve 24 and opens valve 23 so that the oxygen-rich liquid from pot 10 will enter final rectifier H through pipe 25 rather than through pipe 26, thereby obtaining the highest purity possible of oxygen with high yield of oxygen.

I claim:

1. Process of separating atmospheric air into oxygen and nitrogen products which includes separating the atmospheric air into high purity nitrogen vapor and oxygen-rich liquid, liquefying the high purity nitrogen vapor, rectifying the oxygen-rich liquid with the liquefied high purity nitrogen as liquid reflux into an oxygen product and a nitrogen product, producing vapor reflux for the said rectification by vaporizing liquid oxygen resulting therefrom, providing a number of intimate contacts of rising vapor and downflowing liquid in the said rectification both above and below the point of introduction of the oxygen-rich liquid whereby a given yield of oxygen product is produced with a purity corresponding to the relative amounts of oxygen and nitrogen products withdrawn from the process, and changing the ratio of intimate contacts above and below the point of introduction of the oxygen-rich liquid with the same total number of intimate contacts whereby the yield of the oxygen product is changed with a changed purity corresponding to the relative amounts of oxygen and nitrogen products withdrawn from the process.

2. Process of separating atmospheric air into oxygen and nitrogen products as in claim 1 wherein the ratio of oxygen-rich liquid to liquefied high purity nitrogen from the preliminary separation remains substantially constant.

3. Apparatus for separating atmospheric air into oxygen and nitrogen products including preliminary means for separating the atmospheric air into high purity nitrogen vapor and oxygen-rich liquid, a condenser for liquefying the high purity nitrogen vapor, a final rectifier for rectifying the oxygen-rich liquid with the liquefied high purity nitrogen as liquid reflux into an oxygen product and a nitrogen product, an inlet at a certain level for the oxygen-rich liquid, a number of trays within the final rectifier disposed partly above and partly below said inlet, a second inlet for the oxygen-rich liquid at a different level with respect to which said trays are differently disposed, and means for changing from one to the other inlet.

4. Apparatus for separating atmospheric air into oxygen and nitrogen products which includes preliminary means for separating the atmospheric air into oxygen-rich liquid and nitrogen vapor, a condenser for liquefying the nitrogen vapor, a final rectifier for rectifying the oxygen-rich liquid with the liquefied nitrogen as liquid reflux into an oxygen product and a nitrogen product, and means for changing from one inlet to another inlet at a different level for the oxygen-rich liquid into the final rectifier in combination with means for varying the rates of withdrawal of oxygen and nitrogen products therefrom whereby the purity of the nitrogen product is changed with a corresponding change in the purity of the oxygen product.

5. Apparatus for separating atmospheric air into oxygen and nitrogen products which includes preliminary means for separating the atmospheric air into oxygen-rich liquid and nitrogen vapor with a purity of 99 per cent or better, a condenser for liquefying the nitrogen vapor, a final rectifier with one inlet for the oxygen-rich liquid to rectify it with the liquefied nitrogen as reflux into an oxygen product over 99 per cent pure and a nitrogen product of lower purity and another inlet at a different level to rectify it into a nitrogen product at least 99 per cent pure with reduced oxygen purity, and means for changing from one to the other inlet for the oxygen-rich liquid into the final rectifier in combination with means for varying the rates of withdrawal of oxygen and nitrogen products therefrom.

6. Apparatus for separating atmospheric air into oxygen and nitrogen products which includes preliminary means for separating the atmospheric air into oxygen-rich liquid and nitrogen vapor, a condenser for liquefying the nitrogen vapor, a final rectifier for rectifying the oxygen-rich liquid with the liquefied nitrogen as liquid reflux into an oxygen product and a nitrogen product, said final rectifier containing trays divided into three groups, and means for introducing the oxygen-rich liquid at either of the two points of division between the three groups of trays.

7. Apparatus for separating atmospheric air into oxygen and nitrogen products as in claim 6 wherein the final rectifier has a shell larger in diameter than said trays, and each group of trays rests on a support attached to said shell with the topmost tray enlarged to fit tightly into said shell.

8. A rectifier having a shell and groups of trays with an outside diameter less than the inside diameter of said shell, each group of trays resting on a support attached to said shell with the topmost tray enlarged to fit tightly into said shell.

9. A rectifier as in claim 8 wherein the inlet for the fluid to be rectified is a perforated pipe extending across said shell between groups of trays.

10. A rectifier as in claim 8 including an inlet for liquid reflux and a vessel at the top of said shell with a vapor seal for the overflow of liquid reflux to said groups of trays and outlets for vapor separated from the liquid.

11. Apparatus for separating atmospheric air into oxygen and nitrogen products including a preliminary rectifier for rectifying the atmospheric air into high purity nitrogen vapor and oxygen-rich liquid, a condenser for liquefying the high purity nitrogen vapor, a final rectifier for rectifying the oxygen-rich liquid with the liquefied high purity nitrogen as liquid reflux into an oxygen product and a nitrogen product, a vaporizer for vaporizing liquid oxygen from the final rectifier in liquefying high purity nitrogen vapor from the preliminary rectifier to produce liquid reflux therein, means for admitting liquid oxygen into the condenser and vaporizing it in liquefying high purity nitrogen vapor with about the same oxygen liquid level in the condenser as in the vaporizer, the heat transfer surfaces in condenser and vaporizer being disposed so that the ratio of the heating surface areas submerged in liquid oxygen in condenser and vaporizer remains substantially constant with varying oxygen liquid level whereby the ratio of oxygen-rich liquid accumulating in the preliminary rectifier and liquefied high purity nitrogen accumulating in the condenser remains substantially constant, in combination with two inlets for the oxygen-rich liquid into the final rectifier at different levels and means for changing from one inlet to the other inlet.

12. Apparatus for separating atmospheric air into oxygen and nitrogen products as in claim 11 wherein means are provided to discharge automatically as rapidly as they accumulate, the oxygen-rich liquid from the preliminary rectifier and the liquefied nitrogen from the condenser.

13. Apparatus for separating atmospheric air into oxygen and nitrogen products including a preliminary rectifier for rectifying the atmospheric air into high purity nitrogen vapor and oxygen-rich liquid, a condenser for liquefying the high purity nitrogen vapor, a final rectifier for rectifying the oxygen-rich liquid with liquefied high purity nitrogen as liquid reflux into an oxygen product and a nitrogen product, a vaporizer for vaporizing liquid oxygen from the final rectifier in liquefying high purity nitrogen vapor from the preliminary rectifier to produce liquid reflux therein, said vaporizer being arranged for counterflow of rising nitrogen vapor and downflowing nitrogen liquid whereby the purity of the nitrogen vapor is increased before liquefying it in the condenser, in combination with two inlets for the oxygen-rich liquid into the final rectifier at different levels and means for changing from one inlet to the other inlet.

14. Apparatus for separating atmospheric air into oxygen and nitrogen products as in claim 13 including an exchanger for liquefying high purity nitrogen vapor from said vaporizer by warming the nitrogen product from the final rectifier and means for commingling the liquefied nitrogen from the exchanger with liquefied nitrogen from the condenser, thereby increasing the liquefied nitrogen reflux in the final rectifier and raising the purity of said nitrogen product.

15. Apparatus for separating a gaseous mixture including a preliminary rectifier for rectifying the gaseous mixture into a nearly pure vapor and an impure liquid, a final rectifier for rectifying the impure liquid into a vapor product and a liquid product, a vaporizer for producing vapor reflux for the final rectifier and liquid reflux for the preliminary rectifier by partly vaporizing the liquid product of the final rectifier and partly liquefying nearly pure vapor from the preliminary rectifier, a condenser for producing liquid reflux for the final rectifier by liquefying nearly pure vapor from the preliminary rectifier in completing the vaporization of the liquid product of the final rectifier, an exchanger for liquefying nearly pure vapor from the preliminary rectifier by warming the vapor product of the final rectifier, the said exchanger comprising multiple tubes through which the said vapor product flows in heat exchange with said nearly pure vapor surrounding the tubes, and means for commingling liquefied vapor from the exchanger with liquefied vapor from the condenser whereby the liquid reflux is augmented in the final rectifier.

16. Apparatus for separating a gaseous mixture as in claim 15 wherein means are provided to convey the nearly pure vapor from the vaporizer to the exchanger and thence to the condenser.

17. Apparatus for separating a gaseous mixture as in claim 15 wherein the exchanger is mounted above the condenser, the shell of the exchanger forms a continuation of the shell of the condenser, the tubes extend between a single compartment at their lower ends and two compartments at their upper ends, and means are provided for the vapor product to enter one upper compartment and to leave the other upper compartment whereby the vapor product flows down through half the tubes and up through the other half.

18. A column for separating atmospheric air into an oxygen product and a nitrogen product comprising a lower group of trays forming a preliminary rectifier for rectifying the atmospheric air into a nitrogen vapor and an oxygen-rich liquid, multiple upper groups of trays forming a final rectifier for rectifying the oxygen-rich liquid with liquefied nitrogen vapor into the oxygen product and the nitrogen product, an intermediate vaporizer for vaporizing the oxygen product of the final rectifier in liquefying nitrogen vapor from the preliminary rectifier, and means for introducing the oxygen-rich liquid from the preliminary rectifier between different groups of trays in the final rectifier whereby nearly pure oxygen is obtained with reduced purity nitrogen or nearly pure nitrogen is obtained with reduced purity oxygen.

19. A column for separating atmospheric air into an oxygen product and a nitrogen product as in claim 18 wherein the final rectifier contains three groups of trays of which the lowest group contains about the same number of trays as both upper groups together.

WILLIAM LANE DE BAUFRE.